(12) United States Patent
Watanabe et al.

(10) Patent No.: US 8,184,421 B2
(45) Date of Patent: May 22, 2012

(54) POWER CONVERTER

(75) Inventors: Yasuto Watanabe, Wako (JP); Satoshi Hashino, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 12/453,766

(22) Filed: May 21, 2009

(65) Prior Publication Data

US 2009/0290269 A1    Nov. 26, 2009

(30) Foreign Application Priority Data

May 21, 2008    (JP) .................................. 2008-133535

(51) Int. Cl.
*H02H 3/00*    (2006.01)
(52) U.S. Cl. ......... 361/101; 361/91.1; 361/111; 363/16; 363/24; 363/131; 363/132
(58) Field of Classification Search .................. 361/101, 361/91.1, 111; 363/16, 24, 131, 132
See application file for complete search history.

(56) References Cited

U.S. PATENT DOCUMENTS

| | | | | |
|---|---|---|---|---|
| 7,292,462 B2* | 11/2007 | Watanabe et al. | ................ | 363/60 |
| 7,304,461 B2* | 12/2007 | Watanabe et al. | ............. | 323/282 |
| 7,504,811 B2* | 3/2009 | Watanabe et al. | ............. | 323/282 |
| 7,965,069 B2* | 6/2011 | Watanabe et al. | ............. | 323/284 |
| 2008/0136260 A1* | 6/2008 | Watanabe et al. | ................ | 307/18 |
| 2010/0155158 A1* | 6/2010 | Azuma et al. | ................ | 180/65.8 |

FOREIGN PATENT DOCUMENTS

| | | |
|---|---|---|
| JP | 2005-224059 | 8/2005 |
| JP | 2005-224060 | 8/2005 |

* cited by examiner

*Primary Examiner* — Patrick Salce
(74) *Attorney, Agent, or Firm* — Squire Sanders (US) LLP (57) ABSTRACT

The objective of the present invention is to provide a power converter capable of not only boosting the voltage but also shutting-off the flowing current, by switching only the switch element. The power converter 1, comprises a first input-output portion 3, a second input-output portion 5, a first capacitor C1, a second capacitor C2 electrically connected with the first capacitor C1 in serial, a first current control block B1, a second current control block B2, a third current control block B3, a fourth current control block B4, and a switching controller 7 operable to switch certain current control blocks, wherein the current flowing direction is opposite to each other between a first current control element B1a (B2a, B3a, B4a) and a second current control element B1b (B2b, B3b, B4b) which compose the current control block B1 (B2, B3, B4).

12 Claims, 7 Drawing Sheets

FIG.1

FIG.3A
Current Flowing Through Between V1 and V2

FIG.3B
Current Shut Off Between V1 and V2

FIG.4

Problem with Abrupt Shut Off

FIG.5A
Current Flowing Before Shut Off V1 → V2 (Mode A1)

FIG.5B
Current Flowing Before Shut Off V1 → V2 (Mode A2)

FIG.6A
Current Flowing Before Shut Off V2→V1 (Mode B1)

FIG.6B
Current Flowing Before Shut Off V2→V1 (Mode B2)

FIG.7A
IGBT + Diode

FIG.7B
Bi-directional IGBT

POWER CONVERTER

CROSS-REFERENCE TO RELATED APPLICATIONS

This application claims the foreign priority benefit under 35 U.S.C. §.119 of Japanese Patent Application No. 2008-133535 filed on May 21, 2008, the disclosure of which is incorporated herein in its entirety.

BACKGROUND OF THE INVENTION

1. Field of the Invention

The present invention relates to a power converter, especially to a power converter that can boost/lower an applied DC voltage by switching on/off a plurality of switch elements and charging/discharging a plurality of capacitors selectively.

2. Description of the Related Art

Japanese Laid-open Patent Application No. 2005-224059 and Japanese Laid-open Patent Application No. 2005-224060 disclose DC/DC power converters boosting and lowering an applied voltage by a desired voltage increase/decrease ratio by predetermined switch elements being switched. Looking to these DC/DC power converters, an overlap time for which a plurality of switch elements are kept switched on is appropriately adjusted when switch elements are switched in order to improve voltage conversion efficiency and miniaturize the size of the power converter.

These conventional DC/DC power converters disclosed in the above mentioned references perform any of a voltage boosting operation, a current-through operation and a regenerating operation by switching on/off a plurality of switch elements and charging/discharging a plurality of capacitors selectively.

These conventional DC/DC power converters have a current through function mode and are capable of outputting an applied voltage without being boosted in this function mode by switching switch elements. Furthermore, they have a current shut-off function mode and are capable of shutting off a current flowing to a capacitor in order to prevent too large a current from flowing to the capacitor by accident in this current shut-off function mode. This current shut-off function mode is enabled by a contactor box which is additionally installed in the conventional DC/DC power converter.

SUMMARY OF THE INVENTION

The conventional DC/DC power converter enables the current-through function mode only by switching the switch elements. However the conventional DC/DC power converter cannot have the shut-off mode for shutting off the through-current without a contactor box additionally installed. Therefore there is a problem with the system inclusive of the DC/DC power converter becoming complicated if a contactor box is installed.

Considering the aforementioned state of art, the objective of the present invention is to solve the problems described heretofore, that is, to provide a power converter capable of the current shut-off operation as well as the voltage boosting/lowering operation only by switching the switch elements.

In order to solve the aforementioned problem, the power converter of the present invention has the first aspect of comprising a first input-output portion comprising a first positive terminal and a first negative terminal, a second input-output portion comprising a second positive terminal and a second negative terminal, a first capacitor comprising a first positive capacitor electrode electrically connected with the second positive terminal and a first negative capacitor electrode, a second capacitor electrically connected in series with the first capacitor and comprising a second positive capacitor electrode electrically connected with the first negative capacitor electrode and a second negative capacitor electrode electrically connected with the second negative terminal, a first current control block, a second current control block, a third current control block, a fourth current control block and a switching controller for switching each of the first, second, third and fourth current control block for an electrical current to flow therethrough, wherein the first input-output portion is electrically connected with the second input-output portion through the first capacitor, the second capacitor, the first current control block, the second current control block, the third current control block and the fourth current control block, wherein the first current control block is electrically connected with the first positive terminal and the second positive terminal, the second current-control block is electrically connected with the first positive terminal and the first negative capacitor electrode, the third current control block is electrically connected with the first negative terminal and the first negative capacitor electrode, and the fourth current control block is electrically connected with the first negative terminal and the second negative terminal, and wherein each of the first current control block, the second current control block, the third current control block and the fourth current control block comprises a first current control element through which an electrical current flows exclusively in a first direction and a second current control element through which an electrical current flows exclusively in a second direction, the first direction is opposite to the second direction, and each of the first and second current control elements is capable of shutting off an electrical current flowing therethrough between the first input-output portion and the second input-output portion.

According to this first aspect, the present power converter is capable of boosting the applied input voltage by switching on/off all current control blocks through a switching controller so as to charge and discharge the first capacitor and the second capacitor, which are connected in series. In addition, when an input voltage is boosted, current control blocks are switched to have a current flow through either the first current control element or the second current control element at a time in each switched current control block. Since the direction in which a current flows through the first current control element is opposite to the direction in which a current flows through the second current control element, the conduction loss is reduced.

The power converter of the present invention has a second aspect of comprising a first input-output portion comprising a first positive terminal and a first negative terminal, a second input-output portion comprising a second positive terminal and a second negative terminal, a first capacitor comprising a first positive capacitor electrode electrically connected with the second positive terminal and a first negative capacitor electrode, a second capacitor electrically connected in series with the first capacitor and comprising a second positive capacitor electrode electrically connected with the first negative capacitor electrode and a second negative capacitor electrode electrically connected with the second negative terminal, a first current control block, a second current control block, a first diode, a second diode, and a switching controller for switching each of the first and second current control blocks for an electrical current to flow therethrough, wherein the first input-output portion is electrically connected with the second input-output portion through the first capacitor, the second capacitor, the first current control block, the second current control block, the first diode and the second diode, wherein the first diode is electrically connected with the first positive terminal and the second positive terminal, the first current-controller block is electrically connected with the first positive terminal and the first negative capacitor electrode, the second current control block is electrically connected with the first negative terminal and the first negative capacitor, and the second diode is electrically connected with the first negative terminal and the second negative terminal, and wherein each of the first current control block and the second current control block comprises a first current control element through which an electrical current flows exclusively in a first direction and a second current control element through which an electrical current flows exclusively in a second direction, the first direction is opposite to the second direction, and each of the first and second current control elements is capable of shutting off an electrical current flowing therethrough between the first input-output portion and the second input-output portion.

According to this second aspect, the present power converter is capable of boosting an applied input voltage by switching on/off the first current control block and the second current control block with the switching controller so as to charge and discharge the first capacitor and the second capacitor, which are connected in series.

In addition, when an input voltage is boosted, current control blocks are switched to have a current flow through either the first current control element or the second current control element at a time in each switched current control block. Since the direction in which a current flows through the first current control element is opposite to the direction in which a current flows through the second current control element, the conduction loss is reduced.

Furthermore since there are current control blocks which are not switched with the switching controller and are kept off for the voltage boosting operation, each of these current control blocks is replaced with a single diode in this second aspect. Accordingly the circuit of the power converter is simplified in this second aspect.

The power converter of the present invention has a third aspect of comprising a first input-output portion comprising a first positive terminal and a first negative terminal, a second input-output portion comprising a second positive terminal and a second negative terminal, a first capacitor comprising a first positive capacitor electrode electrically connected with the second positive terminal and a first negative capacitor electrode, a second capacitor electrically connected in series with the first capacitor and comprising a second positive capacitor electrode electrically connected with the first negative capacitor electrode and a second negative capacitor electrode electrically connected with the second negative terminal, a first current control block, a second current control block, a first diode, a second diode, and a switching controller for switching each of the first and second current control blocks for an electrical current to flow therethrough, wherein the first input-output portion is electrically connected with the second input-output portion through the first capacitor, the second capacitor, the first current control block, the second current control block, the first diode and the second diode, wherein the first current-controller block is electrically connected with the first positive terminal and the second positive terminal, the first diode is electrically connected with the first positive terminal and the first negative capacitor electrode, the second diode is electrically connected with the first negative terminal and the first negative capacitor, and the second current control block is electrically connected with the first negative terminal and the second negative terminal, and wherein each of the first current control block and the second current control block comprises a first current control element through which an electrical current flows exclusively in a first direction and a second current control element through which an electrical current flows exclusively in a second direction, the first direction is opposite to the second direction, and each of the first and second current control elements is capable of shutting off an electrical current flowing therethrough between the first input-output portion and the second input-output portion.

According to this third aspect, the present power converter is capable of lowering an applied input voltage by switching on/off the first current control block and the second current control block with the switching controller so as to charge and discharge the first capacitor and the second capacitor, which are connected in series.

In addition, when an input voltage is lowered, current control blocks are switched to have a current flow through either the first current control element or the second current control element at a time in each switched current control block. Since the direction in which a current flows through the first current control element is opposite to the direction in which a current flows through the second current control element, the conduction loss is reduced.

Furthermore since there are current control blocks which are not switched with the switching controller and are kept off for the voltage lowering operation, each of these current control blocks is replaced with a single diode in this third aspect. Accordingly the circuit of the power converter is simplified in this third aspect.

The power converter of the present invention has a fourth aspect of at least one of the first current control element and the second current control element being an Insulated Gate Bipolar Transistor, in addition to any of the first, second and third aspect.

According to this fourth aspect, the power converter controls the current control blocks in each of which an IGBT is used for at least one of the first current control element and the second current control element and a couple of circuit paths in a current control block, at least one of which includes an IGBT, may be energized at the same time. As a result the conduction loss is reduced when a capacitor is charged by having a current flowing to it and it is possible to improve the voltage conversion efficiency.

The power converter of the present invention has a fifth aspect of the switching controller having a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode, in addition to any of the first to the fourth aspect.

According to this fifth aspect, the power converter is capable of absorbing the surge voltage in the surge voltage absorbing mode.

DETAILED DESCRIPTION OF THE PREFERRED EMBODIMENTS

Hereinafter is explained the embodiment of the present invention in detail with reference to the figures.

<Circuit of the Power Converter Comprising Bi-Directional IGBTs Used for Each Current Control Block>

Figure 1:
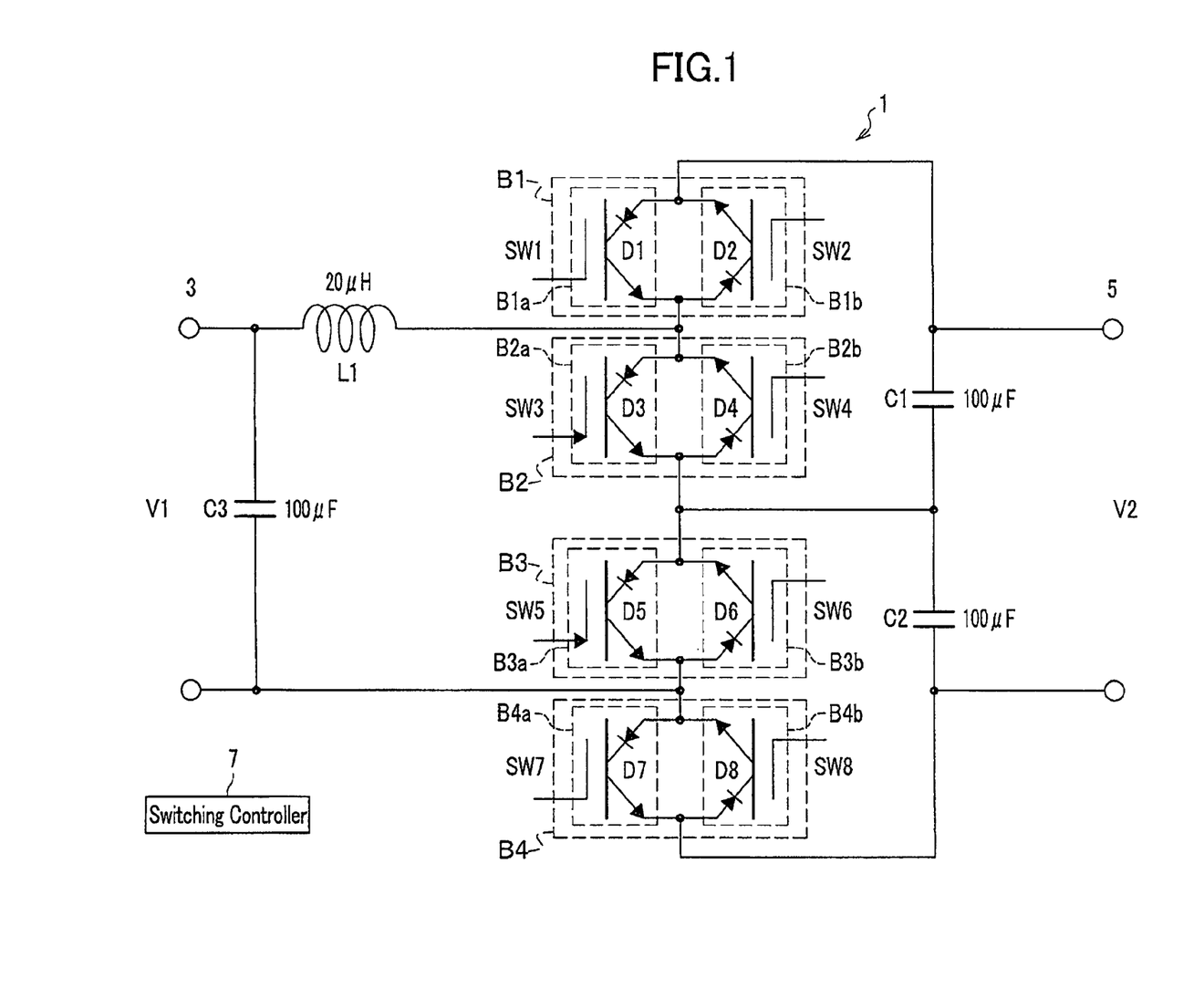
FIG. 1 is a circuit diagram of a power converter according to an embodiment of the present invention.

FIG. 1 is a circuit diagram of a power converter according to an embodiment of the present invention. The power converter 1 is capable of boosting an applied input voltage as exemplified in FIG. 4 and comprises an input portion (first input-output portion) 3, an output portion (second input-output portion) 5, capacitors C1, C2, C3, an inductor L1, current control blocks B1, B2, B3, B4, and a switching controller 7.

A bi-directional IGBT (Insulated Gate Bipolar Transistor) constitutes each of the current control block B1, B2, B3, B4 in the present power converter 1, while the current control block is constituted by an IGBT and a shunt diode for the conventional power converter. This bi-directional IGBT consists of a couple of IGBTs whose current flowing directions are opposite to each other and which constitute a reverse current flow prevention type IGBT module.

In the case of the conventional power converter, a current flowing through the shunt diode coupled with the IGBT cannot be shut off even if all the switch elements are switched off. On the contrary, the power converter 1 has not only a function to boost/lower an input voltage but also a current through conducting function as well as stopping supplying a current because each current control element in the current control block B1, B2, B3, B4 can be switched on/off independently. Therefore, the power converter 1 does not need to have an additional contactor box as is needed by the conventional power converter and has a function to boost/lower an input voltage at a predetermined voltage increase(decrease) ratio as well as a function to stop supplying a current, although the power converter 1 does not have an additional contactor box and has a relatively simple circuit.

The input portion 3 is connected with a DC power supply E (V) and an input voltage is applied to the input portion 3. A positive input terminal of the input portion 3 is electrically connected; via the inductor L1 and the current control block B1, with a positive electrode of the capacitor C1 and a positive output terminal of the output portion 5. A negative input terminal of the input portion 3 is electrically connected, via the current control block B4, with a negative electrode of the capacitor C2 and a negative output terminal of the output portion 5.

The output portion 5 is provided to output a boosted voltage V2. The positive terminal of this output portion 5 is electrically connected with the positive terminal of the capacitor C1. The negative terminal of this output portion 5 is electrically connected with the negative terminal of the capacitor C2.

The capacitor C1 is electrically connected in series with the capacitor C2. The capacitors C1, C2 are alternatively charged to store charges with an incoming charging current and alternatively discharged with an outgoing discharging current. In this embodiment, the capacitor C1, C2 are film capacitors of 100 μ.F.

The capacitor C3 works as a smoothing capacitor and is capable of lowering equivalently the impedance (hereinafter, referred to as "output impedance.") of the power source with a higher output impedance as well as stabilizing the voltage boosting/lowering operation. The capacitor C3 may be omitted for the power supply with a sufficiently low output impedance. In this embodiment, this capacitor C3 is an electrolyte capacitor, however, a film capacitor also suffices.

The inductor L1 is electrically connected with the positive (or negative) terminal of the input portion 3, magnetically energized by the supplied current from the input portion 3 in response to the switching of the current control block B1, and then supplies the de-energized current to the capacitor C1, C2.

The current control block B1 comprises a bi-directional IGBT consisting of two current control elements, that is, a first current control element B1a and a second current control element B1b. The current control element B1a has a diode function portion D1 and a switch function portion SW1, and the current control element B1b has a diode function portion D2 and a switch function portion SW2. Reverse blocking IGBTs are preferably used for the current control element B1a, B1b in terms of break-down failure and energy loss, since the reverse blocking IGBT can withstand a higher reverse voltage than the ordinary IGBT and the conduction loss of the reverse blocking IGBT is smaller than in IGBT combined with a shunt diode.

The current control block B2 comprises a bi-directional IGBT consisting of two current control elements, that is, a first current control element B2a and a second current control element B2b. The current control element B2a has a diode function portion D3 and a switch function portion SW3, and the current control element B2b has a diode function portion D4 and a switch function portion SW4.

The current control block B3 comprises a bi-directional IGBT consisting of two current control elements, that is, a first current control element B3a and a second current control element B3b. The current control element B3a has a diode function portion D5 and a switch function portion SW5, and the current control element B3b has a diode function portion D6 and a switch function portion SW6.

The current control block B4 comprises a bi-directional IGBT consisting of two current control elements, that is, a first current control element B4a and a second current control element B4b. The current control element B4a has a diode function portion D7 and a switch function portion SW7, and the current control element B4b has a diode function portion D8 and a switch function portion SW8.

The current flowing directions of the current control elements B1a, B1b are opposite to each other. Similarly, the current flowing directions of the current control elements B2a, B2b are opposite to each other. The current flowing directions of the current control elements B3a, B3b are opposite to each other. The current flowing directions of the current control elements B4a, B4b are opposite to each other.

The switching controller 7 is capable of switching on and off the switch function portion SW3 in the current control block B2 and the switch function portion SW5 in the current control block B3 to control the current flow. When the switch function portion SW3 is switched on by the switching controller 7, a current can flow through the diode function portion D3 in the current control block B2. When the switch function portion SW5 are switched on by the switching controller 7, a current can flow through the diode function portion D5 in the current control block B3.

In the present embodiment, an input voltage V1 applied to the input portion 3 is boosted or lowered to a voltage V2 to be output from the output portion 5. Whenever the voltage boosting operation is carried out, the switch function portion SW1 in the current control block B1, the switch function portion SW4 in the current control block B2, the switch function portion SW6 in the current control block B3, and the switch function portion SW7 in the current control block B4 are always kept off. On the other hand, whenever the voltage lowering operation is carried out, the switch function portion SW2 in the current control block B1, the switch function portion SW3 in the current control block B2, the switch function portion SW5 in the current control block B3, and the switch function portion SW8 in the current control block B4 are always kept off.

In this embodiment the switching controller 7 is capable of switching on and off the switch function portion SW2 in the current control block B1, the switch function portion SW3 in the current control block B2, the switch function portion SW5 in the current control block B3, and the switch function portion SW8 in the current control block B4 in the present embodiment. If all of the switch function portions SW2, SW3, SW5, and SW8 are switched off simultaneously by the switching controller 7, the current to flow from the input portion 3 to output portion 5 is shut off.

If the power converter 1 is intended exclusively for the voltage boosting operation or only for the voltage lowering operation, there are some current control blocks that are not switched at all. Each of these current control blocks may be replaced with a single diode.

For example, if the power converter 1 is intended exclusively for the voltage boosting operation, each of the current control blocks B1, B4 may be replaced with a single diode. If the power converter 1 is intended exclusively for the voltage lowering operation, each of the current control blocks B2, B3 may be replaced with a single diode.

<Current Flow, Voltage Waveform>

Figure 2A:
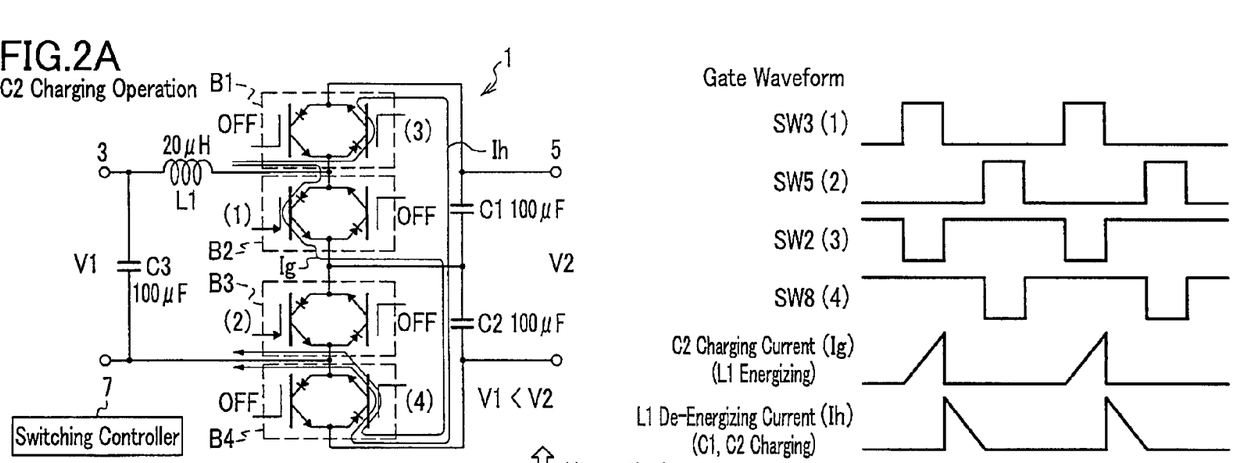
FIG. 2A is a figure indicating current flow in the power converter circuit and waveforms when the capacitor C2 is being charged.
Figure 2B:
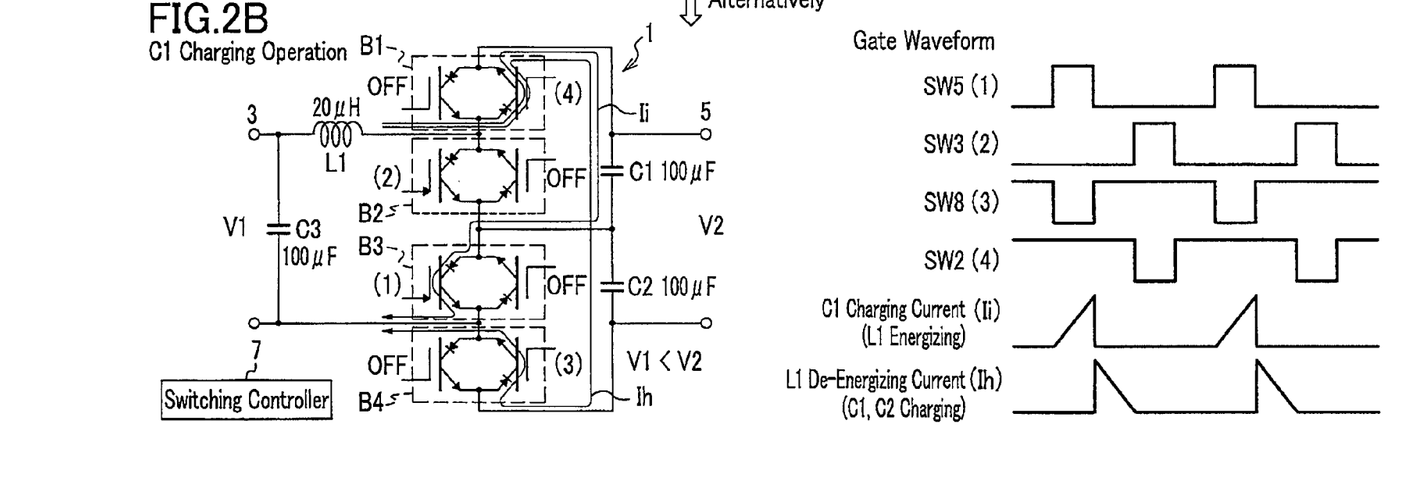
FIG. 2B is a figure indicating a current flow in the power converter circuit and waveforms when the capacitor C1 is being charged.

Next are described the current flow and the voltage waveforms in the power converter 1, with reference to the FIGS. 2A and 2B (and FIG. 1 if necessary). FIGS. 2A and 2B illustrates current-flows, gate voltage waveforms applied to the switch function portions SW2, SW3, SW5, SW8 respectively in the current control blocks B1, B2, B3 and B4, waveforms of the currents charging the capacitors C1, C2, and waveforms of the current energizing the inductor 1 for boosting the input voltage by the relatively small voltage boosting ratio (for example, from 1 to 2), respectively.

In order to charge up the capacitor C2 during the voltage boosting operation, the switch function portion SW3 of the current control block B2 and the switch function portion SW5 of the current control block B3 are alternatively switched on by the switching controller 7 with the on-durations of the switch function portions SW3, SW5 being not overlapped with each other, as is seen in the gate voltage waveforms in FIG. 2A.

In the power converter 1, the switch function portion SW2 in the current control block B1 is switched on at the time when the switch function portion SW3 is switched off, switched off at the time when the switch function portion SW3 is switched on and kept on while the switch function portion SW3 is kept off. Similarly, the switch function portion SW8 of the current control block B4 is switched on at the time when the switch function portion SW5 in the current control block B3 is switched off, switched off at the time when the switch function portion SW5 is switched on and kept on while the switch function portion SW5 is kept off, in the power converter 1.

Then in the power converter 1, charging current Ig is flowing into the capacitor C2 with the inductor L1 being energized, while the switch function portion SW3 in the current control block B2 is kept on. Furthermore, the de-energized current Ih of the inductor L1 is flowing from the time the switch function portion SW3 is switched off to the time the switch function portion SW5 is switched on, in the power converter 1.

As shown in FIG. 2A of "C2 charging operation", the charging current Ig of the capacitor C2 is flowing through the inductor L1, the diode function portion D3 in the current control block B2 and the capacitor C2 to the diode function portion D8 in the current control block B4. The de-energized current Ih of the inductor L1 is flowing through the diode function portion D2 in the current control block B1, the capacitors C1 and the capacitor C2 to the diode function portion D8 in the current control block B4.

In order to charge up the capacitor C1 during the voltage boosting operation, the switch function portion SW5 of the current control block B3 and the switch function portion SW3 of the current control block B2 are alternatively switched on by the switching controller 7 with the on-durations of the switch function portions SW5, SW3 being not overlapped with each other, as is seen in the gate-voltage waveforms in FIG. 2B.

In the power converter 1, the switch function portion SW8 in the current control block B1 is switched on at the time when the switch function portion SW5 is switched off, switched off at the time when the switch function portion SW5 is switched on and kept on while the switch function portion SW3 is kept off. Similarly, in the power converter 1, the switch function portion SW2 in the current control block B1 is switched on at the time when the switch function portion SW3 is switched off, switched off at the time when the switch function portion SW3 is switched on and kept on while the switch function portion SW3 is kept off.

Then in the power converter 1, charging current Ii is flowing into the capacitor C1 with the inductor L1 being energized while the switch function portion SW5 in the current control block B3 is kept on. Furthermore, the de-energized current Ih of the inductor L1 is flowing from the time the switch function portion SW5 is switched off from on to the time the switch function portion SW3 is switched on, in the power converter 1.

As shown in FIG. 2B of "C1 charging operation", the charging current Ii to the capacitor C1 is flowing through the inductor L1, the diode function portion D2 in the current control block B1 and the capacitor C1 to the diode function portion D5 in the current control block B3. The de-energized current Ih of the inductor L1 is flowing through the diode function portion D2 in the current control block B1, the capacitors C1 and the capacitor C2 to the diode function portion D8 in the current control block B4.

<Surge Voltage Absorbing Mode>

Hereinafter are explained the surge voltage absorbing modes that are available with the power converter 1 with reference to FIGS. 3A and 3B to FIGS. 6A and 6B. As has been explained, there are 2 operation modes for the power converter 1. One is the current through conductive mode in which a current is flowing between the input portion 3 and the output portion. The other is the current shut-off mode in which no current is flowing between the input portion 3 and the output portion 5. When the current through conductive mode changes to the current shut-off mode at once, a high surge voltage is generated at L1 and applied to the switch control portions B1 to B4, which could break elements therein. In order to prevent element's break-down due to the surge voltage, the power converter 1 has surge voltage absorbing modes, each of which corresponds to the direction in which the current is flowing between the input portion 3 and the output portion 5 and reduces the surge voltage applied to he switch control portions B1 to B4.

Each surge voltage absorbing mode is intended to have either the capacitor C1 or the capacitor C2 absorb a generated surge voltage by switching on or off some of the switch control blocks. Since the inductance of the inductor L1 is relatively small, the surge voltage is absorbed by a capacitor which is either the capacitor C1 or the capacitor C2, the voltage of the capacitor does not rise significantly. The time needed to absorb the surge voltage is within a few milliseconds.

Figure 3A:
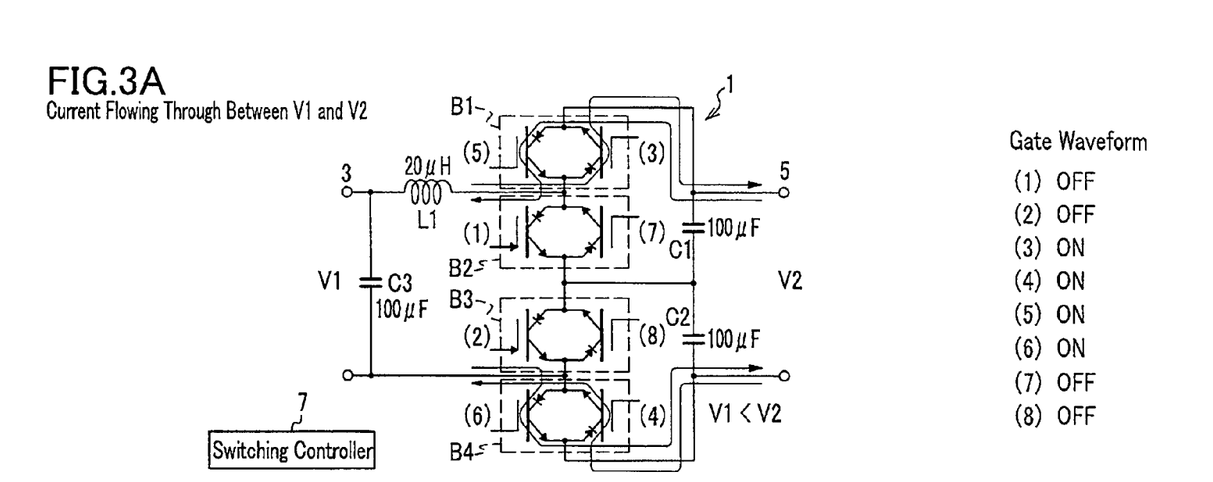
FIG. 3A is a figure indicating current flow and gate waves when the power converter is in the current through conductive mode.
Figure 3B:
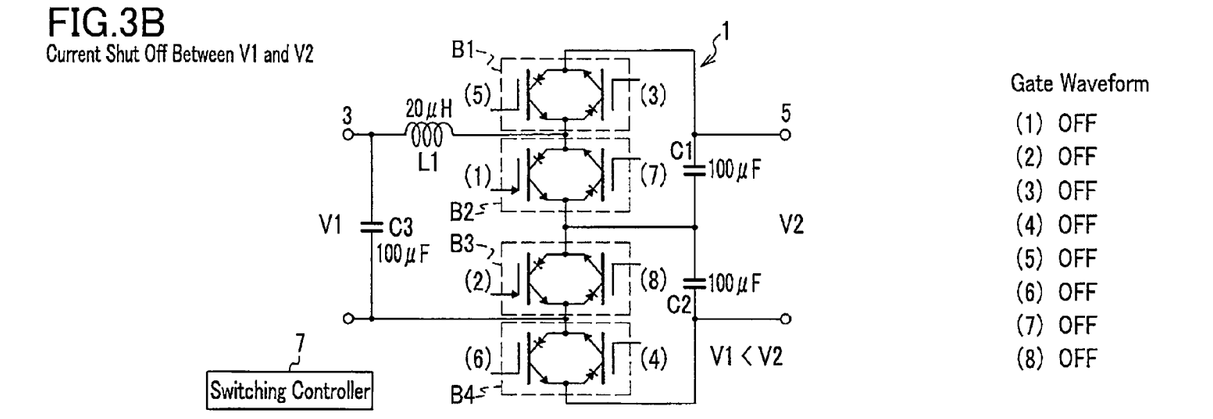
FIG. 3B is a figure indicating no current flow and gate waves when the power converter is in the current shut-off mode.

Firstly with reference to FIGS. 3A and 3B are explained the current through conductive mode described in FIG. 3A, in which a current is flowing between the input portion and the output portion, and the current shut-off mode described in FIG. 3B, in which no current is flowing between them.

As shown in FIG. 3A, when the power converter 1 is in the current through conductive mode, off are kept the switch function portion SW3 (1) of the current control block B2, the switch function portion SW5 (2) of the current control block B3, the switch function portion SW4 (7) of the current control block B2 and the switch function portion SW6 (8) of the current control block B3 while on are kept the switch function portion SW2 (3) of the current control block B1, the switch function portion SW8 (4) of the current control block B4 and the switch function portion SW1 (5) of the current control block B1, the switch function portion SW7 (6) of the current control block B4.

As shown in FIG. 3B, when the power converter 1 is in the current shut-off mode, off are kept the switch function portion SW3 (1) of the current control block B2, the switch function portion SW5 (2) of the current control block B3, the switch function portion SW2 (3) of the current control block B1, the switch function portion SW8 (4) of the current control block B4, the switch function portion SW1 (5) of the current control block B1, the switch function portion SW7 (6) of the current control block B4, the switch function portion SW4 (7) of the current control block B2 and the switch function portion SW6 (8) of the current control block B3.

Figure 4:
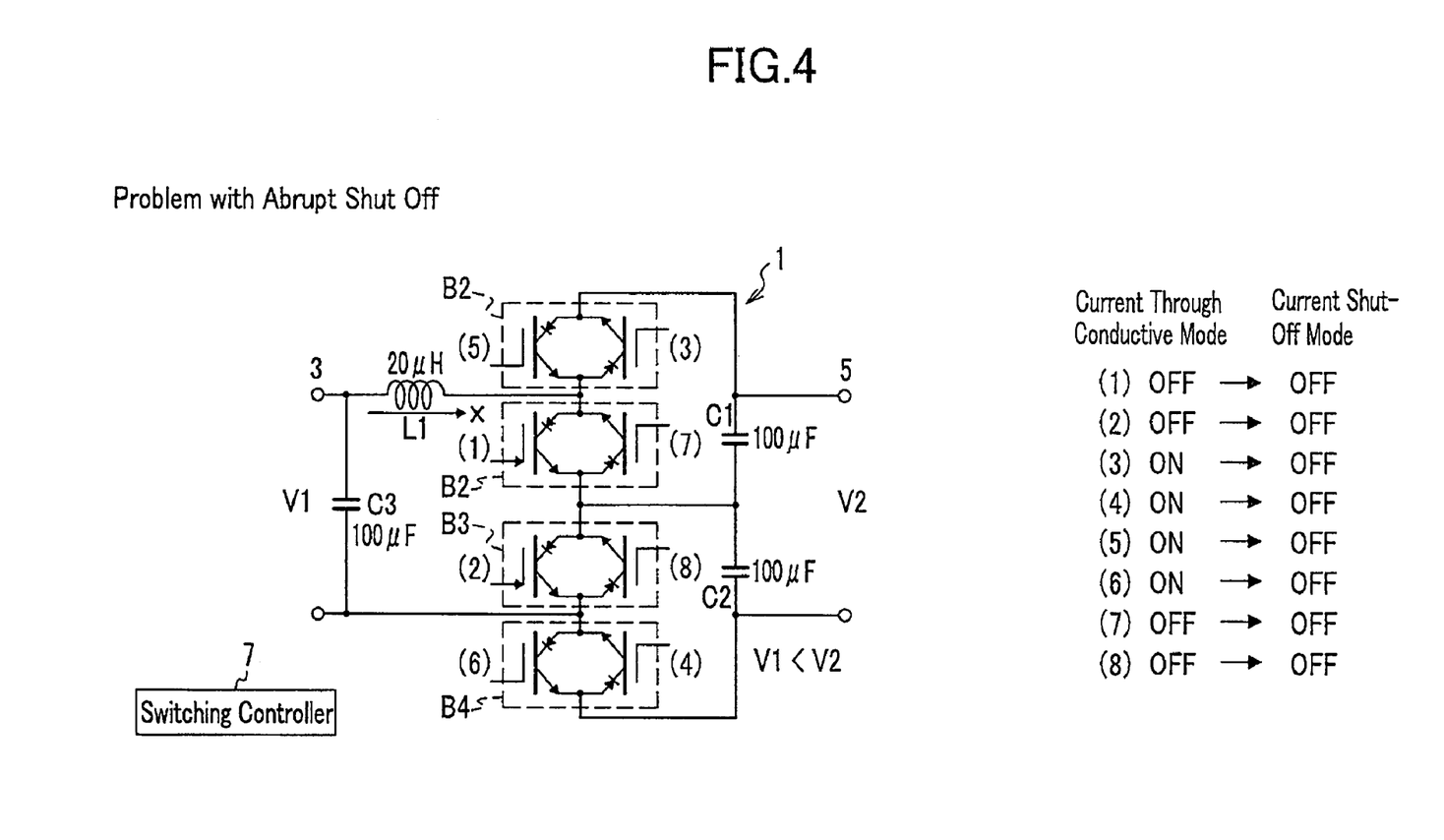
FIG. 4 is a figure schematically explaining a problem with shutting off the current between the input portion and the output portion at once.

Next is described a problem with the abrupt transition into the shut-off mode in the power converter 1, with reference to the FIG. 4.

If the operation-mode changes directly from the current through conductive mode in FIG. 3A to the current shut-off mode in FIG. 3B, high surge voltages are generated at L1 and applied to the current control block B1 and the current control block B4 as is seen from the FIG. 4. The reason for these high voltages being generated is that the switch function portion SW2 (3) of the current control block B1, the switch function portion SW8 (4) of the current control block B4, the switch function portion SW1 (5) of the current control block B1 and the switch function portion SW7 (6) of the current control block B4 are switched off from on, as shown in FIG. 4.

Next with reference to FIGS. 5A, 5B, 6A, and 6B are explained the surge voltage absorbing modes used for the power converter 1 in this embodiment. There are a couple of surge voltage absorbing modes for the current flowing from the input portion 3 to the output portion 5 before the current is shut off (Mode A1, A2). There are also a couple of surge voltage absorbing modes for the current flowing from the output portion 5 to the input portion 3 before the current is shut off (Mode B1, B2).

Figure 5A:
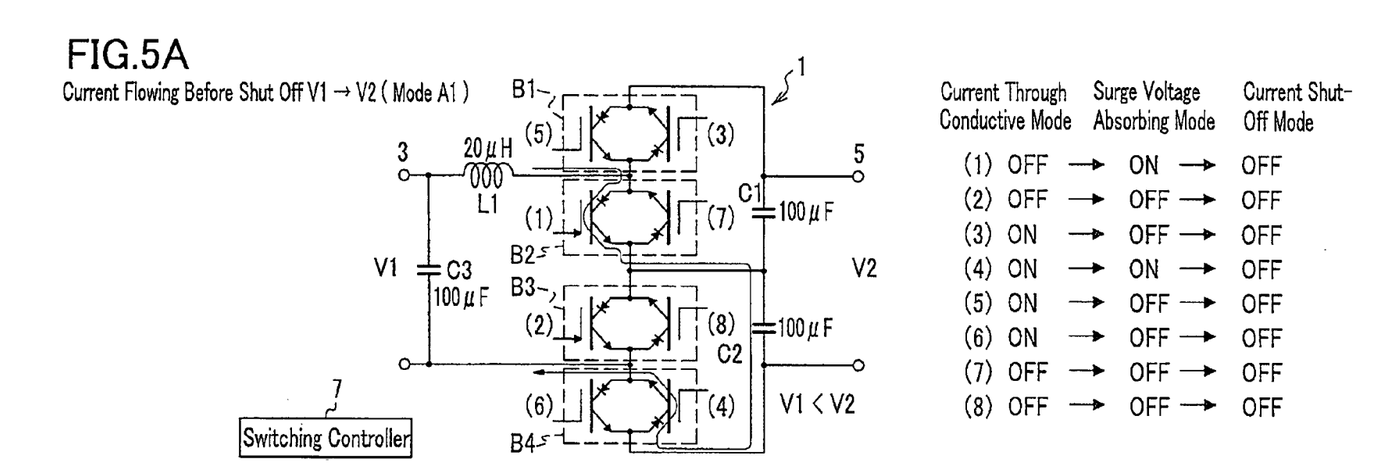
FIG. 5A is a figure schematically explaining a surge voltage absorbing mode using the capacitor C2 if a current is flowing from the input portion to the output portion before the current is shut off.

FIG. 5A indicates the surge voltage absorbing mode A1. If a current is flowing from the input portion 3 to the output portion 5 before the current is shut off, not all the switch function portions become off simultaneously at once. As shown in FIG. 5A, the following intermediate operation is performed in the power converter 1 before all the switch function portions become off in the surge voltage absorbing mode A1. The switch function portion SW3 (1) of the current control block B2 is switched on from off while the switch function portion SW5 (2) of the current control block B3 is kept off, the switch function portion SW2 (3) of the current control block B1 is switched off from on while the switch function portion SW8 (4) of the current control block B4 is kept on, and both the switch function portion SW1 (5) of the current control block B1 and the switch function portion SW7 (6) of the current control block B4 are switched off from on while both the switch function portion SW4 (7) of the current control block B2 and the switch function portion SW6 (8) of the current control block B3 are kept off.

As is seen from FIG. 5A the surge voltage is absorbed by the capacitor C2 in the surge voltage absorbing mode A1.

Figure 5B:
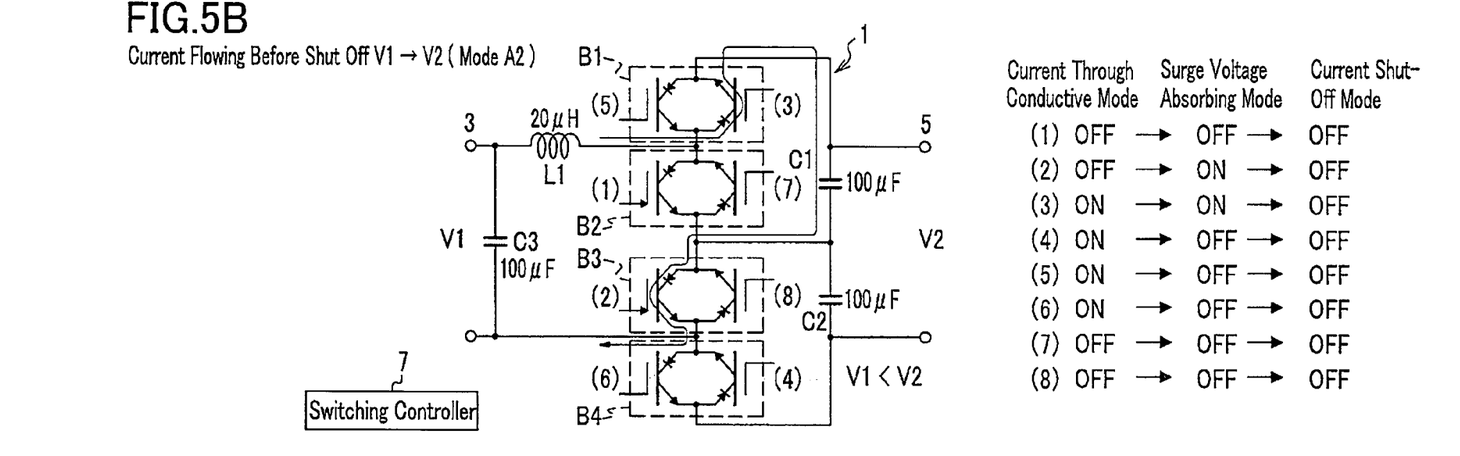
FIG. 5B is a figure schematically explaining a surge voltage absorbing mode using the capacitor C1 if a current is flowing from the input portion to the output portion before the current is shut off.

FIG. 5B indicates the surge voltage absorbing mode A2. If a current is flowing from the input portion 3 to the output portion 5 before the current is shut off, the following intermediate operation is performed in the power converter 1 before all the switch function portions become off in the surge voltage absorbing mode A2. While off are kept the switch function portion SW3 (1) of the current control block B2, the switch function portion SW4 (7) of the current control block B2 and the switch function portion SW6 (8) of the current control block B3 and on is kept the switch function portion SW2 (3) of the current control block B1, on from off is switched the switch function portion SW5 (2) of the current control block B3 and off from on are switched the switch function portion SW8 (4) of the current control block B4, the switch function portion SW1 (5) of the current control block B1 and the switch function portion SW7 (6) of the current control block B4.

As is seen from FIG. 5B the surge voltage is absorbed by the capacitor 1 in the surge voltage absorbing mode A2.

Figure 6A:
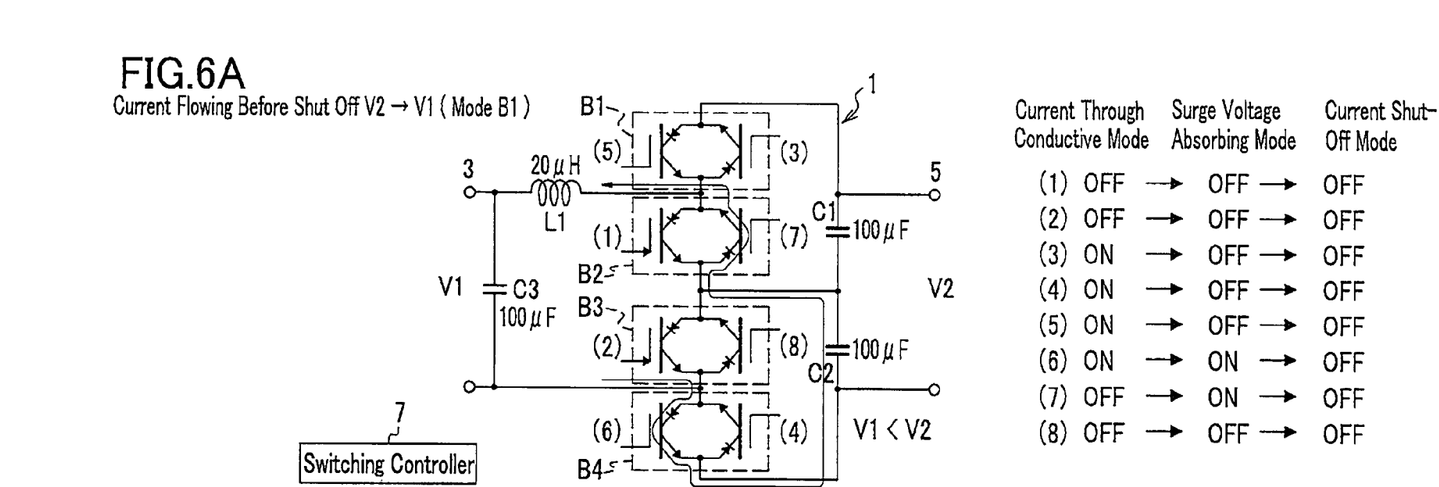
FIG. 6A is a figure schematically explaining a surge voltage absorbing mode using the capacitor C2 if a current is flowing from the output portion to the input portion before the current is shut off.

FIG. 6A indicates the surge voltage absorbing mode B1. If a current is flowing from the output portion 5 to the input portion 3 before the current is shut off, the following intermediate operation is performed in the power converter 1 before all the switch function portions become off in the surge voltage absorbing mode B1. While off are kept the switch function portion SW3 (1) of the current control block B2, the switch function portion SW5 (2) of the current control block B3 and the switch function portion SW6 (8) of the current control block B3 and on is kept the switch function portion SW7 (6) of the current control block B4, off from on are switched the switch function portion SW2 (3) of the current control block B1, the switch function portion SW8 (4) of the current control block B4 and the switch function portion SW1 (5) of the current control block B1 and on from off is switched the switch function portion SW4 (7) of the current control block B2.

As is seen from FIG. 6A the surge voltage is absorbed by the capacitor C2 in the surge voltage absorbing mode B1.

Figure 6B:
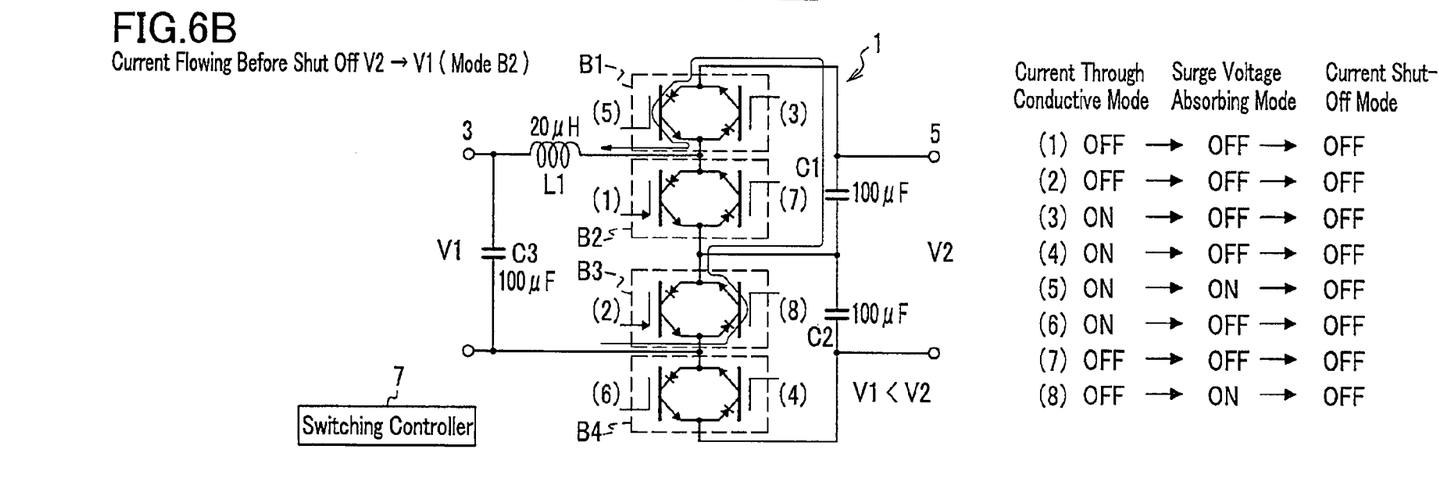
FIG. 6B is a figure schematically explaining a surge voltage absorbing mode using the capacitor C1 if a current is flowing from the output portion to the input portion before the current is shut off.

FIG. 6B indicates the surge voltage absorbing mode B2, If a current is flowing from the output portion 5 to the input portion 3 before the current is shut off, the following intermediate operation is performed in the power converter 1 before all the switch function portions become off in the surge voltage absorbing mode B2. While off are kept the switch function portion SW3 (1) of the current control block B2, the switch function portion SW5 (2) of the current control block B3 and the switch function portion SW4 (7) of the current control block B2 and on is kept the switch function portion SW1 (5) of the current control block B1, off from on are switched the switch function portion SW2 (3) of the current control block B1, the switch function portion SW8 (4) of the current control block B4 and the switch function portion SW7 (6) of the current control block B4 and on from off is switched the switch function portion SW6 (8) of the current control block B3.

As is seen from FIG. 6B the surge voltage is absorbed by the capacitor C1 in the surge voltage absorbing mode B2

<Advantage of the Power Converter of the Present Embodiment in Comparison with the Conventional Power Converter>

Figure 7A:
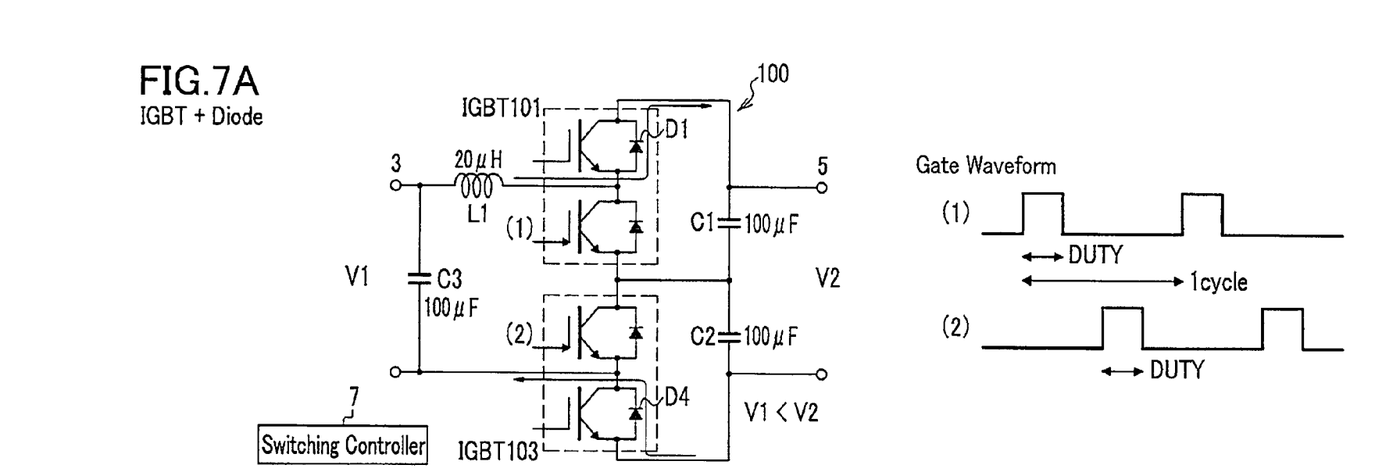
FIG. 7A is a figure schematically explaining operation of the conventional power converter comprising current control blocks each consisting of an IGBT and a diode
Figure 7B:
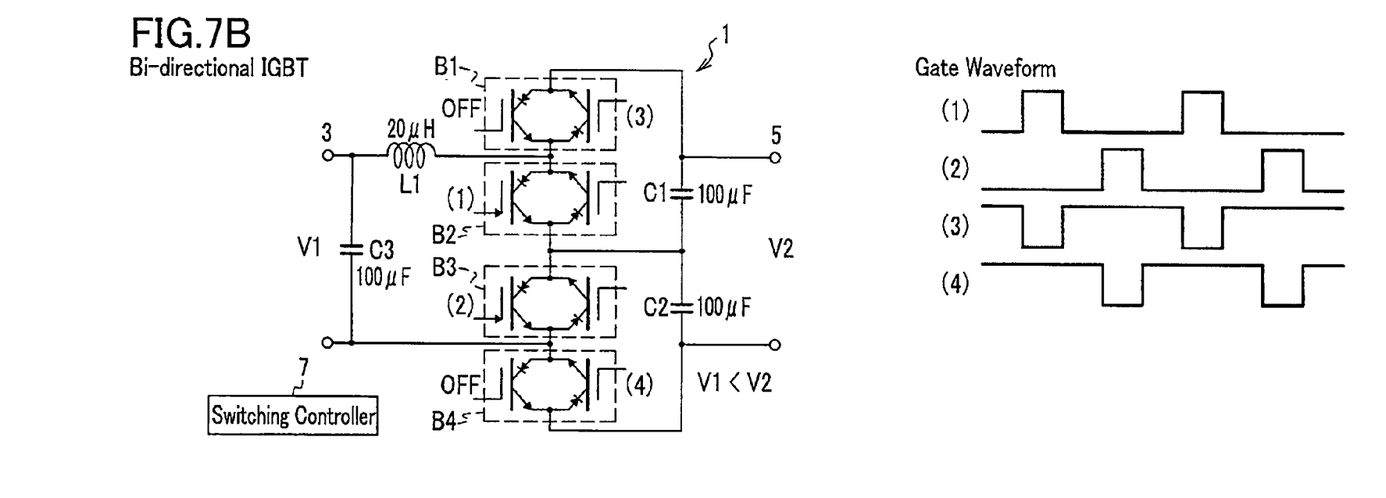
FIG. 7B is a figure schematically explaining operation of the power converter of the present invention.

Next, the advantages of the power converter 1 are described in comparison with the conventional power converter with the current control blocks each consisting of an IGBT and a shunt diode, with reference to the FIGS. 7A and 7B.

Looking to the conventional power converter 100, the lower portion (1) in the IGBT 101 and the upper portion (2) of the IGBT 103 are switched as is seen from the "gate waveform" in FIG. 7A. Accordingly, a current is flowing only through the diode in the upper portion of the IGBT 101 which is not switched and the diode in the lower portion of the IGBT 103 which is not switched, as is seen from FIG. 7A.

To the contrary, since the power converter 1 of the present embodiment adopts current control blocks B1, B2, B3, B4 as shown in FIG. 7B, each flywheel diode used for the conventional power converter 100 is replaced with a reverse blocking IGBT. As a result, the shut-off function of the current supply is realized by a simple circuit in the power converter 1. Furthermore, in the case of the power converter 1, a current remaining on stopping supplying power, which would has no place to flow into, flows into the capacitor to be charged and a breakage of each element due to the surge voltage is efficiently prevented.

According to the power converter of the present embodiment, since the direction in which a current is flowing through the first current control element is opposite to the direction in which a current is flowing through the second current control element in each current control block, the conduction loss is smaller than the conventional current control block consisting of an IGBT and a diode combined with the IGBT. In addition the circuit of the power converter is simplified by using the present embodiment.

In addition the power converter of the present embodiment is capable of not only controlling the current flow for boosting and lowering the input voltage with the switching controller, but also shutting off the current by controlling the current control element with the switching controller. Furthermore because of the current supply stop function of the present embodiment the surge voltage generated on shutting off the current is absorbed.

Heretofore, although the embodiment according to the present invention is described, the scope of the present invention is not limited by the aforementioned embodiment. For example, in the present embodiment, description is directed to the voltage boosting operation, however, the present invention is also applicable to the power converter capable of the voltage lowering operation.

We claim:
1. A power converter comprising
a first input-output portion comprising a first positive terminal and a first negative terminal,
a second input-output portion comprising a second positive terminal and a second negative terminal,
a first capacitor comprising a first positive capacitor electrode electrically connected with the second positive terminal and a first negative capacitor electrode,
a second capacitor electrically connected in series with the first capacitor and comprising a second positive capacitor electrode electrically connected with the first negative capacitor electrode and a second negative capacitor electrode electrically connected with the second negative terminal,
a first current control block,
a second current control block,
a third current control block,
a fourth current control block and
a switching controller for switching each of the first, second, third and fourth current control blocks for an electrical current to flow therethrough,
wherein the first input-output portion is electrically connected with the second input-output portion through the first capacitor, the second capacitor, the first current control block, the second current control block, the third current control block and the fourth current control block,
wherein the first current control block is electrically connected with the first positive terminal and the second positive terminal, the second current-control block is electrically connected with the first positive terminal and the first negative capacitor electrode, the third current control block is electrically connected with the first negative terminal and the first negative capacitor electrode, and the fourth current control block is electrically connected with the first negative terminal and the second negative terminal, and
wherein each of the first current control block, the second current control block, the third current control block and the fourth current control block comprises a first current control element through which an electrical current flows exclusively in a first direction between the first input-output portion and the second input-output portion and a second current control element through which an electrical current flows exclusively in a second direction between the first input-output portion and the second input-output portion, the first direction being opposite to the second direction, wherein the first current control element is configured to shut off the electrical current flowing in the first direction and the second current control element is configured to shut off the electrical current in the second direction.

2. The power converter according to claim 1, wherein at least one of the first current control element and the second current control element is an Insulated Gate Bipolar Transistor.

3. The power converter according to claim 2, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

4. The power converter according to claim 1, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

5. A power converter comprising
a first input-output portion comprising a first positive terminal and a first negative terminal,
a second input-output portion comprising a second positive terminal and a second negative terminal,
a first capacitor comprising a first positive capacitor electrode electrically connected with the second positive terminal and a first negative capacitor electrode,
a second capacitor electrically connected in series with the first capacitor and comprising a second positive capacitor electrode electrically connected with the first negative capacitor electrode and a second negative capacitor electrode electrically connected with the second negative terminal,
a first current control block,
a second current control block,
a first diode,
a second diode, and
a switching controller for switching each of the first and second current control blocks for an electrical current to flow therethrough,
wherein the first input-output portion is electrically connected with the second input-output portion through the first capacitor, the second capacitor, the first current control block, the second current control block, the first diode and the second diode,
wherein the first diode is electrically connected with the first positive terminal and the second positive terminal, the first current-controller block is electrically connected with the first positive terminal and the first negative capacitor electrode, the second current control block is electrically connected with the first negative terminal and the first negative capacitor electrode, and the second diode is electrically connected with the first negative terminal and the second negative terminal, and
wherein each of the first current control block and the second current control block comprises a first current control element through which an electrical current flows exclusively in a first direction between the first input-output portion and the second input-output portion and a second current control element through which an electrical current flows exclusively in a second direction between the first input-output portion and the second input-output portion, the first direction being opposite to the second direction, wherein the first currently control element is configured to shut off the electrical current flowing in the first direction and the second current control element is configured to shut off the electrical current in the second direction.

6. The power converter according to claim 5, wherein at least one of the first current control element and the second current control element is an Insulated Gate Bipolar Transistor.

7. The power converter according to claim 6, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

8. The power converter according to claim 5, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

9. A power converter comprising
a first input-output portion comprising a first positive terminal and a first negative terminal,
a second input-output portion comprising a second positive terminal and a second negative terminal,
a first capacitor comprising a first positive capacitor electrode electrically connected with the second positive terminal and a first negative capacitor electrode,
a second capacitor electrically connected in series with the first capacitor and comprising a second positive capacitor electrode electrically connected with the first negative capacitor electrode and a second negative capacitor electrode electrically connected with the second negative terminal,
a first current control block,
a second current control block,
a first diode,
a second diode, and
a switching controller for switching each of the first and second current control blocks for an electrical current to flow therethrough,
wherein the first input-output portion is electrically connected with the second input-output portion through the first capacitor, the second capacitor, the first current control block, the second current control block, the first diode and the second diode,
wherein the first current-controller block is electrically connected with the first positive terminal and the second positive terminal, the first diode is electrically connected with the first positive terminal and the first negative capacitor electrode, the second diode is electrically connected with the first negative terminal and the first negative capacitor electrode, and the second current control block is electrically connected with the first negative terminal and the second negative terminal, and
wherein each of the first current control block and the second current control block comprises a first current control element through which an electrical current flows exclusively in a first direction between the first input-output portion and the second input-output portion and a second current control element through which an electrical current flows exclusively in a second direction between the first input-output portion and the second input-output portion, the first direction being opposite to the second direction, wherein the first current control element is configured to shut off the electrical current flowing in the first direction and the second current control element is configured to shut off the electrical current in the second direction.

10. The power converter according to claim 9, wherein at least one of the first current control element and the second current control element is an Insulated Gate Bipolar Transistor.

11. The power converter according to claim 10, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

12. The power converter according to claim 9, wherein the switching controller has a current through conductive mode for having an electrical current flow between the first input-output portion and the second input-output potion, a current shut-off mode for shutting off the electrical current, and a surge voltage absorbing mode for absorbing a surge voltage generated on a the transition from the current through conductive to the current shut-off mode.

* * * * *